US007835359B2

(12) United States Patent
Kim et al.

(10) Patent No.: US 7,835,359 B2
(45) Date of Patent: Nov. 16, 2010

(54) METHOD AND APPARATUS FOR STRIPING MESSAGE PAYLOAD DATA OVER A NETWORK

(75) Inventors: Chulho Kim, Poughkeepsie, NY (US); Rajeev Sivaram, West Orange, NJ (US); Richard R. Treumann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/298,322

(22) Filed: Dec. 8, 2005

(65) Prior Publication Data

US 2007/0133536 A1 Jun. 14, 2007

(51) Int. Cl.
H04L 12/28 (2006.01)
H04L 12/54 (2006.01)
(52) U.S. Cl. .................. 370/392; 370/394; 370/428
(58) Field of Classification Search ............ 370/392, 370/394, 428
See application file for complete search history.

(56) References Cited

U.S. PATENT DOCUMENTS

| | | | |
|---|---|---|---|
| 6,647,438 B1 * | 11/2003 | Connor et al. ............... | 710/22 |
| 6,754,735 B2 | 6/2004 | Kale et al. | |
| 6,820,264 B1 | 11/2004 | Bashkansky et al. | |
| 2003/0033477 A1 | 2/2003 | Johnson et al. | |
| 2003/0039250 A1 * | 2/2003 | Nichols et al. ............... | 370/394 |
| 2003/0041163 A1 * | 2/2003 | Rhoades et al. ............. | 709/232 |
| 2003/0225794 A1 | 12/2003 | Soulier et al. | |
| 2004/0123063 A1 | 6/2004 | Dalal et al. | |
| 2004/0215868 A1 | 10/2004 | Solomon et al. | |
| 2007/0005881 A1 * | 1/2007 | Garney ....................... | 711/112 |
| 2007/0116026 A1 * | 5/2007 | Huang et al. ................ | 370/412 |
| 2009/0222704 A1 * | 9/2009 | Meyer et al. ................ | 714/748 |

* cited by examiner

Primary Examiner—Daniel J Ryman
Assistant Examiner—John Blanton
(74) Attorney, Agent, or Firm—Lawrence D. Cutter, Esq.; Matthew W. Baca, Esq.; Daryl K. Neff, Esq.

(57) ABSTRACT

A method, an apparatus and a recording medium are provided for communicating message payload data, especially non-contiguous message data, from a first node of a network to a second node of the network in response to a request to transmit a message. Such method includes dividing the length of a data payload to be transmitted into a plurality of submessage payload lengths, i.e., into at least a first submessage payload length and a second submessage payload length. Then, a first ordered submessage is transmitted from the first node for delivery to the second node, the first ordered submessage having the first submessage payload length. A first state of an environment is then determined in the first node as if the step of transmitting the first ordered submessage were already completed. Without having to complete the step of transmitting the first ordered submessage, a second ordered submessage is then transmitted from the first node for delivery to the second node, the second submessage having the second submessage payload length, the second submessage being transmitted in a way that takes into account the first state of the environment in the first node.

16 Claims, 3 Drawing Sheets

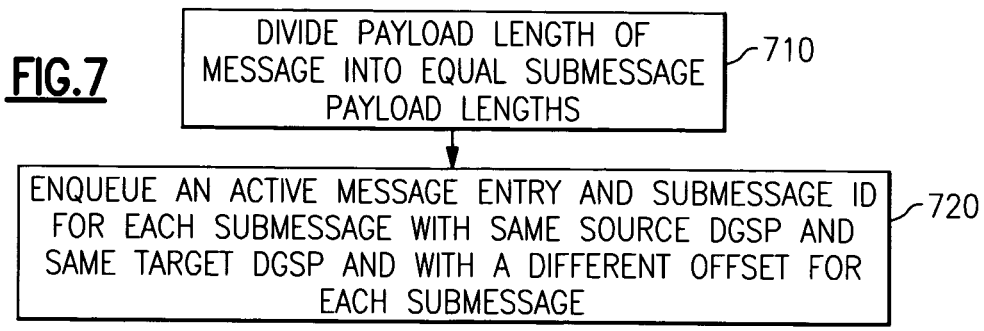
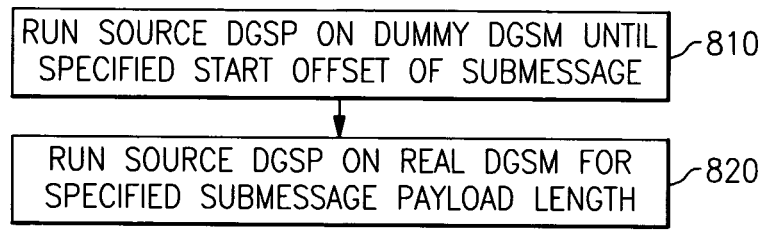
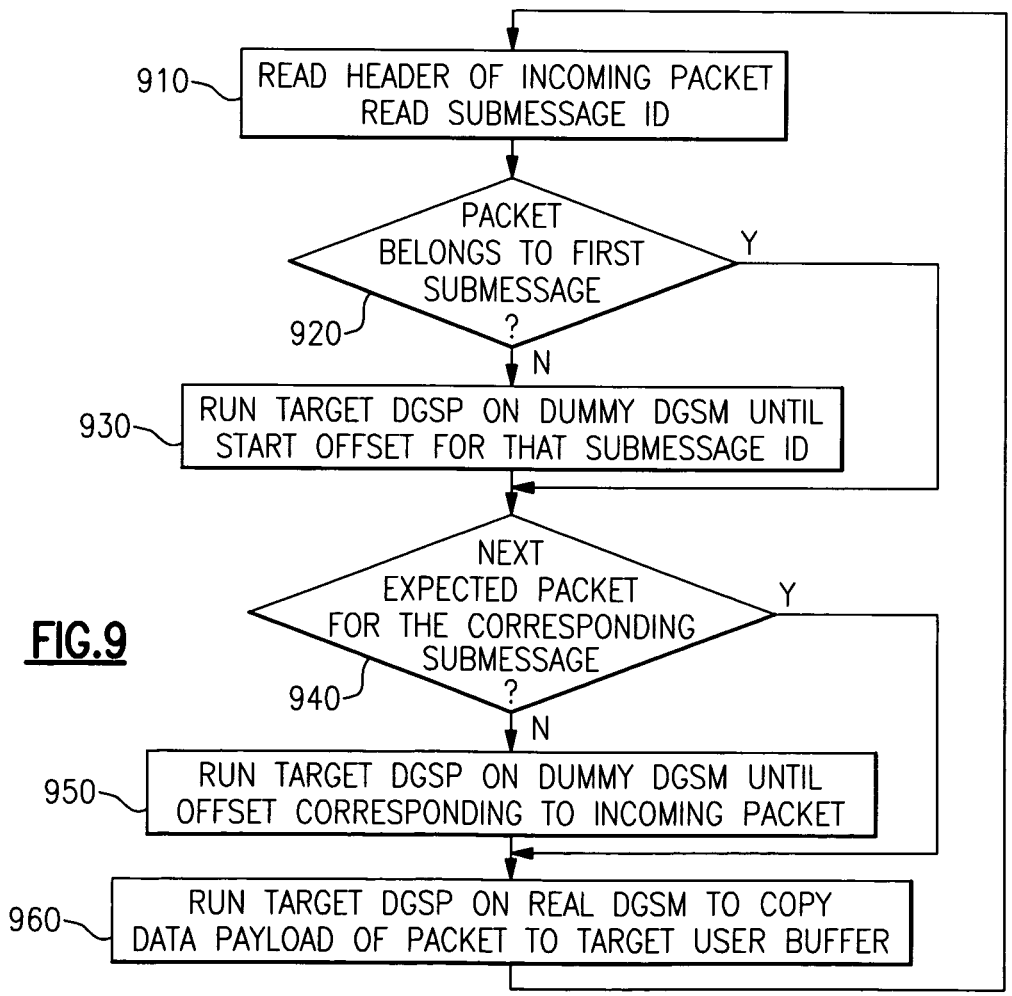

METHOD AND APPARATUS FOR STRIPING MESSAGE PAYLOAD DATA OVER A NETWORK

BACKGROUND OF THE INVENTION

The present invention relates to data communications and more particularly to a method of communicating message payload data in a striped manner over a network.

Communication bandwidth is a key element of communication protocol performance. Communication bandwidth can sometimes be increased when messages are striped. The striping of a message refers to transmission of the message between two endpoints (a source node and a "target node" or "destination node") of a network as separately managed submessages via communication resources (network adapter resources and communication paths) that are allowed to vary from one submessage to another.

The striping of messages is relatively straightforward when the message data to be transmitted are stored at contiguous locations of a user buffer. In such case, a message can be easily divided up into submessages, and the start and endpoints of the data to be transmitted are easily determined.

However, messages can also be transmitted from data that is noncontiguous, that is, data which are distributed at different locations. An example of a noncontiguous data transfer protocol is one in which the locations of data to be transferred are defined by execution of a program. When such program is executed, the resulting locations of data transferred by the program are defined by a series of commands such as "Start at offset 10. Copy (transfer) 12 bytes. Skip the next 8 bytes. Copy 6 bytes. Skip the next 7 bytes. Copy 16 bytes." In such an arrangement, it is normally impossible to determine where the locations of the noncontiguous data will be until the data transfer program is executed. For these communication protocols, the striping of a message can be problematic.

Another way that this can be viewed is that during the execution of the communication program, the communication program alters the state of the environment in which it operates. Changes in the environment's state over time while executing the communication program have a profound effect on the ability to concurrently transmit a set of ordered submessages. Such changes make it difficult to determine where the data begins and ends for a particular submessage, e.g., a first submessage, prior to actually assembling and transmitting the particular submessage in its entirety. Without this knowledge, a benefit of striping the message is lost, because a second ordered submessage cannot begin to be transmitted until the first submessage has been completely transmitted.

In view of the foregoing, a method and apparatus are needed by which message payload data, especially noncontiguous data, can be striped as a plurality of ordered submessages even when the execution of a communication program within an environment changes the state of that environment or is needed to determine the locations of the noncontiguous data.

SUMMARY OF THE INVENTION

Thus, according to various aspects of the invention, a method, an apparatus and a recording medium are provided for communicating message payload data from a first node of a network to a second node of the network in response to a request to transmit a message. In a method according to an embodiment of the invention, the length of a data payload to be transmitted in accordance with a request to transmit a message is divided into a plurality of submessage payload lengths, i.e., into at least a first submessage payload length and a second submessage payload length. Then, a first ordered submessage is transmitted having the first submessage payload length from the first node for delivery to the second node. A first state of an environment is then determined in the first node as if the step of transmitting the first ordered submessage is completed. Without having to complete the step of transmitting the first ordered submessage, a second ordered submessage is then transmitted from the first node for delivery to the second node, the second submessage having the second submessage payload length, and the second submessage being transmitted taking into account the first state of the environment in the first node.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 7 is a flow diagram illustrating operations for transmitting submessages in response to a request to send a data payload of given length in accordance with an embodiment of the invention;

FIG. 8 is a flow diagram illustrating operations for receiving a submessage at a receiving node in accordance with an embodiment of the invention; and FIG. 9 is a flow diagram illustrating operations for receiving incoming packets of a submessage at a receiving node in accordance with an embodiment of the invention.

DETAILED DESCRIPTION

Figure 1:
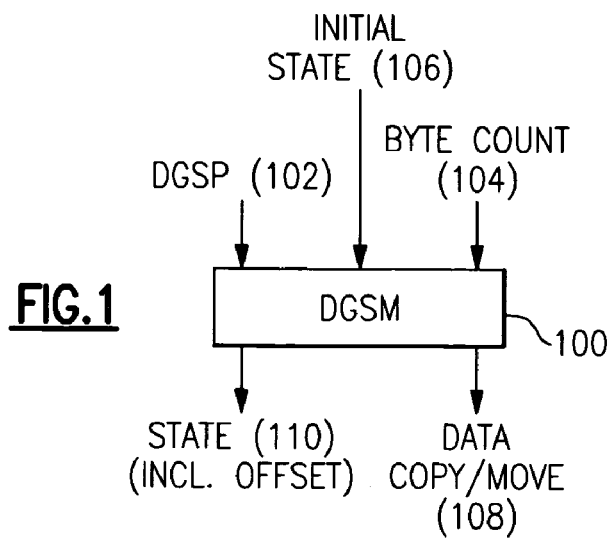
FIG. 1 is a block diagram illustrating a data gather scatter machine ("DGSM") and its operation in accordance with an embodiment of the invention.

In accordance with embodiments of the invention described herein, a method, an apparatus, and a recording medium are provided by which message payload data are communicated from one node of a network to another node thereof in response to a request for transmitting a message. In such embodiments, the length of a data payload to be transmitted in accordance with the request to transmit the message is divided to determine submessage payload lengths for transmitting portions of the message as quasi-independently managed submessages. Then, a communication program is executed relative to an environment on the first node to transmit a first submessage from the first node, the first submessage having a first submessage payload length. As the state of the environment needs to be known to the communication program in order to transmit a second ordered submessage of the plurality of submessages, it is determined and thereafter, the communication program is executed relative to the environment to transmit a second submessage, the second submessage having a second submessage payload length. Thus, the communication program transmits the second ordered submessage while taking into account the state of the environment that exists as if transmission of the first ordered submessage has been completed. As a result, the communication program need not wait to complete the step of transmitting the first ordered submessage before starting to transmit the second ordered submessage, and can stripe the message as a set of multiple concurrently transmitted submessages.

In accordance with an embodiment of the invention, message payload data can be striped from one node of a network to another, even when the message payload data are located in nonconsecutive locations of storage such as a user buffer on the node. Moreover, message payload data can be striped even when the nonconsecutive locations are defined by an irregular algorithm, i.e., an algorithm in which the nth location of stored data is not determined by rule applied uniformly to determining the first through last locations of the stored data. An example of a noncontiguous data transfer protocol is one in which the locations of data to be transferred are defined by execution of a program. When such program is executed, the resulting locations of data transferred by the program are defined by a series of commands such as "Start at offset 10. Copy (transfer) 12 bytes. Skip the next 8 bytes. Copy 6 bytes. Skip the next 7 bytes. Copy 16 bytes." In such an arrangement, it is normally impossible to determine where the locations of the noncontiguous data will be until the program is executed One known way of transmitting and receiving noncontiguous data between two nodes of a network is by a linear data gather scatter program ("DGSP") such as that described in commonly assigned U.S. Pat. No. 6,820,264. The DGSP provides compiled programmatic instructions for transmitting and receiving data, which may include noncontiguous data representations, examples of which are MPI datatypes (i.e., datatypes in accordance with the industry standard Message Passing Interface ("MPI")). The DGSP may be transmitted from the source node to a target (destination) node for instructing the target node how to handle transmitted data such as the data transmitted in a particular message. From the MPI datatypes represented by the DGSP, locations in the source node can be determined from which the source data are to be drawn for transmission. In addition, locations can be determined to which the transmitted data are to be stored in the target node upon receipt of the data.

In its compiled form, the DGSP can contain instructions that require interpretation upon execution. For example, recursive instructions require interpretation upon execution. Recursive instructions are those whose execution depends upon the result of executing other instructions. When an interpreter encounters a recursive instruction, it determines whether the other instruction on which the recursive instruction depends has already been executed. If the other instruction has not yet been executed, for example, when the other instruction itself is a recursive instruction dependent upon execution of a next other instruction, the interpreter has to determine whether the next other instruction has been executed. The same determination can be made again and again until finally a particular instruction is encountered that does not depend upon the result of executing another instruction. Then, once that particular instruction is executed, each of the recursive instructions can then be executed in the reverse order that they were initially encountered by the interpreter. However, in order to execute the series of recursive instructions, the interpreter has to keep track of the first recursive instruction awaiting execution and every recursive instruction that is encountered before the final executable instruction is encountered. The way that an interpreter typically accomplishes this is through a stack. A stack temporarily stores instructions and state variables of an execution environment for access by the interpreter in last-in-first-out order. Last-in-first-out order makes it so that the last received instruction placed on the stack will be the first instruction to be pulled off of the stack again for execution when the interpreter is ready to do so. As one example in connection with the above-described series of recursive instructions, the last recursive instruction received prior to receiving the ready to execute instruction is the first instruction to be pulled off the stack and then executed. Thereafter, the next instruction that was placed prior thereto on the stack is pulled off the stack for execution, because that next instruction then becomes executable using the execution result of the first instruction that was pulled off of the stack.

In order to handle the stream of instructions including recursive instructions contained in a DGSP, at each of the source node and target node of a communication, a data gather scatter machine ("DGSM") is provided. The DGSM is an interpreter of the stream of instructions and noncontiguous data representations that are contained in the DGSP, examples of which include MPI datatype representations. The DGSM takes the instructions provided in the DGSP, interprets them and parses them into a form which can be handled by lower level execution on the node on which the DGSM resides. Typically, the DGSM executes the DGSP for a number of bytes that are specified to the DGSM in some manner, such as in a data movement command from a user program.

Referring to FIG. 1, in a typical example of operation, a particular DGSP 102 is presented to the DGSM 100 with a byte count 104 indicating the number of bytes to be processed. The DGSM executes the DGSP to copy or move the data (108) from a user buffer on the source node for communication over a network adapter for delivery to a target node of the network. As mentioned above, the DGSP is permitted to include recursive instructions and to use recursion to describe recursive data structures. To handle the recursive structures, the DGSM creates and maintains a stack, and maintains the state 110 of the environment (and an offset in the message that it is handling) as it executes the DGSP. Similar to the execution of a program by physical processor hardware (a hardware machine), the execution of a DGSP normally involves a standardized setup of a runtime environment before the machine (the DGSM) is commanded to execute the first instruction of the program (the DGSP). As the DGSP is executed, the state of the execution environment changes. Because the execution environment changes as execution proceeds, when the operations in a DGSP are to be executed at a particular offset within the program, e.g., when bytes 250 to 400 of a 1000 byte message are to be copied, the DGSM must be set up with the same state information 106, including the presence of any pending instructions on the stack, that the DGSM would have had if the DGSM had just processed the preceding bytes of the message up to byte number 249. Thus, the DGSM operates in a manner similar to that of the execution of a program on a real hardware machine in requiring that state information 106 is correct and a stack contains correct information when a program is executed at a particular offset.

The maintenance of state information and a stack during and following execution of a data mover program such as a DGSP is critical to the transmission and reception of lengthier messages. While the length of a message that can be handled by a data mover program such as a DGSP has few constraints, the amount of data that the DGSM can move at one time is constrained by the size of the maximum transmission unit ("MTU") permitted by the underlying transport protocol. A maximum transmission unit (MTU) is defined as the largest size packet or frame, usually specified in octets (eight-bit bytes), that can be sent in a packet- or frame-based network. Thus, the DGSM cannot execute continuously. Rather, the DGSM is invoked for processing incoming message data in bursts that are constrained by the MTU size. In one example of operation, the DGSP on a source node calls the DGSM for moving data for a fixed size portion (MTU) of a message. After it finishes handling that MTU, the DGSM stops execution. If after the DGSM stops execution there are still message bytes remaining to be handled, the DGSM is again called to process the next MTU from the point in the message where the DGSM left off processing the last MTU. However, each time the DGSM begins processing the next MTU, it retrieves stack information and state information representative of the condition of the execution environment at the point where the DGSM finished handling the last MTU.

In certain communication protocols which implement DGSP, the packets of a non-contiguous message can be received in any order at the destination. The transmitted packets correspond to message data at varying offsets into the message. For the DGSP at the receiving side of the message to process the data in the noncontiguous packets, the DGSM must be in the proper state to process the packet data at the corresponding offset into the received message space. Thus, the proper state needs to be determined for processing incoming data packets in absence of the DGSM having processed some or all of the data that was transmitted at the source side before the particular incoming data. Stated another way, there needs to be a way to determine the proper state of the environment and the stack despite certain packets in the transmission order being missing before the present packets arrive for processing by the DGSM.

Figure 2:
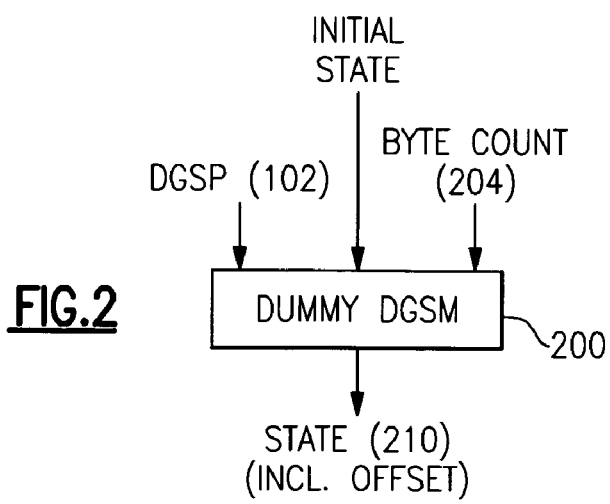
FIG. 2 is a block diagram illustrating a dummy data gather scatter machine ("DGSM") and its operation in accordance with an embodiment of the invention.

In accordance with an embodiment of the invention, the solution to this problem is through use of a dummy DGSM 100 (FIG. 2). A dummy DGSM is an auxiliary interpreter used to execute the DGSP 102 for a specified byte count 204 in order to determine the state of an environment when ordered packets that precede the arrival of the present incoming packets are missing. Like a real DGSM, the dummy DGSM 200 maintains a stack and tracks the state 210 of the environment for a specified byte count 204 input thereto. However, the dummy DGSM does so without performing any of the data transfer (copy) operations that are specified by the DGSP. The net effect of the dummy DGSM is to track the state of the environment from one position (corresponding to a given offset within the message) to a new state where data at a specified offset into the message can be processed, all without the missing data to be processed by the DGSM.

Figure 3:
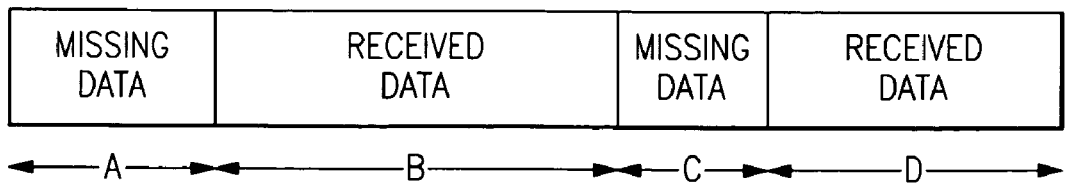
FIG. 3 is a block diagram illustrating the processing of noncontiguous portions of received message data in accordance with an embodiment of the invention.

FIG. 3 illustrates an example of how the dummy DGSM 200 is used together with the real DGSM to receive portions of message data that arrive out of sequence at a target (destination) node. As shown in FIG. 3, some portions of a non-contiguous message have arrived at the target node while other portions have not. Specifically, as shown in FIG. 3, while the first A bytes of the message have not yet arrived, the next B bytes have arrived. On the other hand, while the next C bytes of the message have not arrived, the final D bytes of the message have arrived already.

Figure 4:
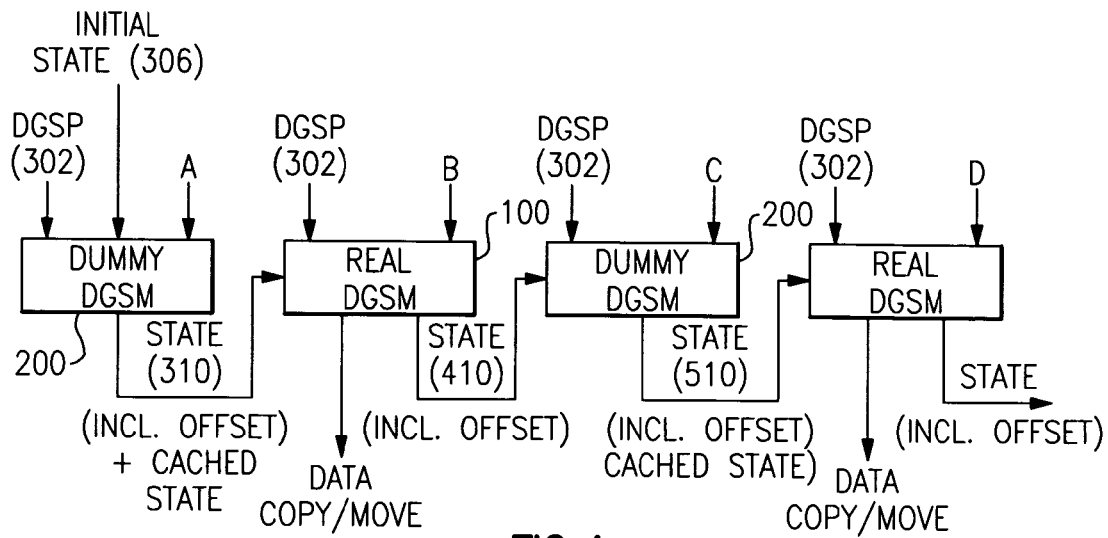
FIG. 4 is a block diagram further illustrating the use of a real DGSM and a dummy DGSM in the processing of noncontiguous portions of received message data in accordance with an embodiment of the invention.

To process the portions of the message that have arrived, the dummy DGSM and the real DGSM are used together as shown in FIG. 4 to distribute the data that is arrived into non-contiguous buffers at the target node. As shown in FIG. 4, starting with the initial state 306, the dummy DGSM 200 executes a DGSP 302 at the target (receiving) node for A bytes to maintain state information and offset (310) of the environment in the same manner that the real DGSM 100 would for processing the first A bytes of the data. Next, using the state information and offset 310 output by the dummy DGSM, the real DGSM 100 executes the DGSP 302 for the B number of bytes that have actually arrived, transferring data into appropriate receiver buffers (as defined by the DGSP and the current state of the environment being maintained now by the real DGSM 100). After processing the B number of bytes, the real DGSM 100 outputs state information and offset 410 that are now appropriate for processing data at the offset A+B, that is an offset corresponding to the addition of the byte count A and byte count B.

Now, since the data at the offset A+B not yet arrived, but data occurring at a byte count C further into the message has arrived, the dummy DGSM 200 executes the DGSP again for a byte count C. In such way, the dummy DGSM generates the DGSM state 510 for processing data that occurs at offset A+B+C in the message. Thereafter, the real DGSM 100 again executes the DGSP 302 for a byte count of D to process the D bytes of data that have arrived, using the instructions in the DGSP 302 to copy data into appropriate target buffers on the receiving node. Preferably, the initial state is cached so that when the initial A bytes of data do arrive, the real DGSM 100 can then execute the DGSP 302 at offset 0 to receive and process the data. Likewise, with the state being cached for offset A+B, when the C bytes of data do finally arrive the real DGSM 100 can then execute the DGSP 302 at the offset A+B to receive and process those C bytes.

Similarly, the same combination of a dummy DGSM and a real DGSM can be used to facilitate efficient striping of a large message from a source node to a target node across a network in response to a request to transmit such message. An application programming interface ("API") divides the data payload length to be transmitted in accordance with the request to send the large message into a set of ordered submessages. Preferably, each of the submessages has the same submessage payload length (byte count) as all of the other submessages, although such division into equal parts is not a necessity. In comparison to other schemes for handling data that is transmitted non-contiguously between nodes of a network, such a division is a trivial low overhead operation. The process of dividing the data payload length of the message into submessages reduces to a simple process of generating the offsets at which each of the submessages is to begin. When the message is to be divided into equal parts, the offsets are generated by a simple calculation of the offset(i)=(i−1)× (message length/number of submessages), where i equals the particular submessage in the ordered submessages ranging from 1, 2, 3, and so on, for example. Once the start offset for each submessage has been generated, and the length of each submessage is known, each submessage can be processed by a messaging transport protocol layer on the source node as if the submessage were an independent message. Specifically, each submessage is processed by the messaging transport protocol layer without that protocol layer needing to be aware of any of the other submessages being processed.

With the start offset and byte count for each submessage thus determined, a DGSM then processes the DGSP to generate the submessage for transferring data available to the source node. Each of the ordered submessages is processable by the same DGSP, but has a different start offset and a different end offset from each of the other submessages that make up the full message. All of the submessages are processed by the same DGSP, but they have different start offsets, and potentially differing lengths. However, for ease of description, it will be assumed that each submessage has the same length as all other submessages being transmitted.

Figure 5:
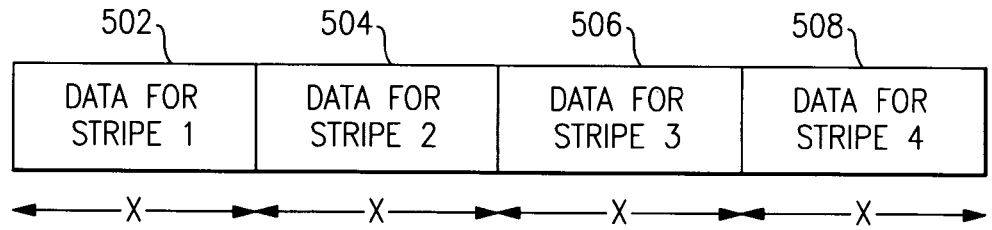
FIG. 5 is a block diagram illustrating the processing of noncontiguous striped submessages of a message data in accordance with an embodiment of the invention.

Referring to FIG. 5, using the start offset for each submessage, the shared DGSP at the source node is executed by the dummy DGSM to generate a state that is unique to the particular submessage. For example, the submessage 506 shown at stripe 3 in FIG. 5 starts at the offset 2X from the start address of the message. In order to generate the proper state for transmitting that submessage 506, the shared DGSP is executed by the dummy DGSM for 2X bytes, starting from the start address of message and the initial state. The state generated thereby then serves as the initial state for processing (i.e., transmitting) the data bytes corresponding to the third submessage (stripe 3, 506). At that point, the shared DGSP at the source node is then executed by the real DGSM for the next X bytes, the DGSM copying or moving data thereby from one or more user buffers on the source node to transmit buffers and transmitting the data of the third stripe from the source node for delivery to a target (destination or receiving) node of the network.

In an example of preferred operation in accordance with an embodiment of the invention, an application makes a call, e.g., "MPI_send" to an API to initiate a data transfer operation. That call typically occurs on a single thread. A portion of library code which makes decision about how to stripe a particular message runs on that single master thread. In such way, decision making and dispatching of that decision are serialized. Then, operations which are performed thereunder to process the stripes of the message are logically concurrent. For example, assume that the library API thread (the master thread) decides to use four stripes to process the call to transfer the data. The master thread will then make four calls, each of which assigns the processing of one of the stripes to a worker thread, assuming that sufficient resources (processors, memory, etc.) are available for the four worker threads to run concurrently. The master thread initializes a shared counter and then watches it as each of the worker threads finish processing each stripe and each increments the shared counter in turn. In this way, the master thread determines the progress and completion of the stripe processing operations from the shared counter.

Thus, in accordance with the above description, an exemplary algorithm for the master thread to make these calls to process the stripes and monitor their completion via a shared counter is as follows:
  for (i=0; i<=3; i++) {
  process_stripe(buff_addr, DGSP, offset(i), len(i));
  }
  watch shared counter to confirm all 4 stripes are done.

Each "process_stripe" call initiates (dispatches) a different worker thread and passes a set of parameters to that thread. Each worker thread preferably runs on a different processor from that on which every other worker thread runs, in order for the stripe processing operations to have a high degree of concurrency. Each worker thread is passed different parameters including a different offset and possibly a different length (len) from the offset and the length which are passed to the other worker threads. Each of the worker threads carries out the same logic to process each stripe concurrently. In this way, the four stripe processing operations which are dispatched by the above-indicated algorithm need not wait for any of the other dispatched stripes to be processed.

In an optional variation of the above example, the master thread can itself run one of the four "process_stripe" operations rather than only dispatching the operations to the four threads and monitoring the shared counter to determine progress.

Once these operations are dispatched to respective threads, each stripe is processed in accordance with an algorithm which can be summarized by the following description, which is more fully described in the description with reference to FIG. 6 below.

process_stripe (buff_addr, DGSP, my_offset, my_len) {
  create a private initial DGSM (ready to work at offset of 0)
  run dummy_DGSM code for "my_offset" bytes (my_offset will be
  0 for one of the stripes and the dummy_DGSM run will be a NO-OP)
  run real_DGSM code for my_len bytes (my_len may be different
  for each stripe)
  increment shared counter
  free any resources
  exit
}

Figure 6:
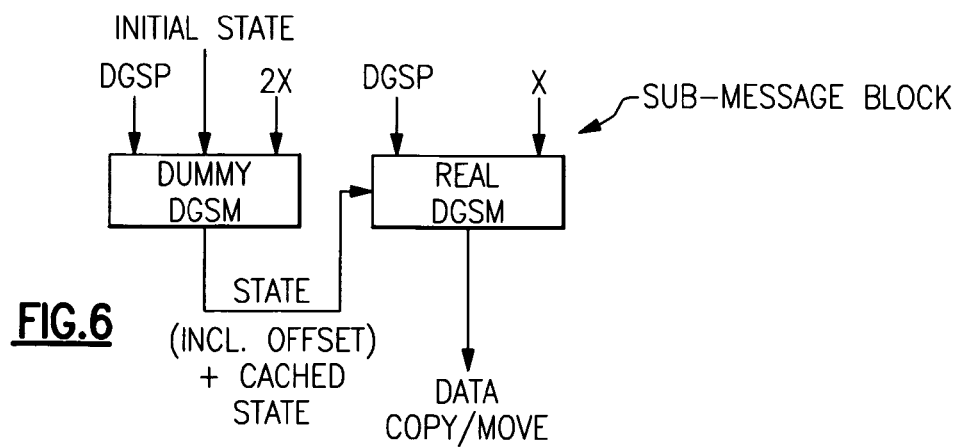
FIG. 6 is a block diagram illustrating the use of a real DGSM and a dummy DGSM to perform send (or receive) processing of a submessage of a message in accordance with an embodiment of the invention.

FIG. 6 graphically depicts the processing by one worker thread of a plurality of concurrently running worker threads to transmit a submessage (Stripe 3) of a message in accordance with the above description. Here, the worker thread utilizes one instance of the real DGSM to transmit the submessage, among a plurality of instances of the real DGSM which are utilized by the respective worker threads. In addition, the worker thread also utilizes an instance of a dummy DGSM among a plurality of instances of the dummy DGSM that are utilized to process each submessage by the respective worker threads. As shown in FIG. 6, the actual copying and movement operations for the submessage occur in the submessage block 620 when the real DGSM 100 executes the DGSP 602 for a submessage payload length of "X", starting with the state of the environment at offset "2X" that exists as if the first 2X bytes of the total message had already been transmitted by the DGSP. The DGSP executed on the dummy DGSM by the particular worker thread for Stripe 3 tracks the state information, stack information and offset that are to exist as if the first 2X bytes were actually transmitted, so that the third submessage can be transmitted properly at that time.

According to the above description, the stripes (submessages) of each message are preferably processed concurrently by multiple threads on multiple CPUs running respective instances of the DGSM and respective instances of the dummy DGSM. However, this need not be so. In an alternative embodiment, the stripes can be processed with logical concurrency on fewer CPUs, e.g., still using multiple threads, DGSMs and dummy DGSMs but by time slicing on a single processor. Such alternative embodiment can be useful in situations where processor bandwidth exceeds bandwidth of each single communication path.

In similar manner, at the receiving node, each submessage need not arrive in order, and packets within each submessage need not arrive in order. Hence, the operations that occur in a target (receiving node) appear similar to those described above with respect to FIG. 6, or to those already shown and described above with respect to FIG. 4.

A point of connection between each of the sub-messages is provided by a set of shared atomic variables at the source node, i.e., such as the above-described shared counter, and another set of shared atomic variables at the target node as each submessage at the source begins transmission, completes transmission, and each submessage at the receiver begins being received, and at some later point is completely received. This allows the messaging transport layer to keep track when the overall message has been completely transmitted or completely received, in order to take message related actions that are specific to the semantics of the messaging transport layer. For example, in a messaging transport layer such as LAPI ("Low-Level Application Programming Interface"), completion handlers may need to be executed, or counters updated.

Recapping the processes described above, FIG. 7 illustrates an algorithm for handling a request to transmit a message as a set of ordered submessages and transmitting each submessage in a similar manner to the way it would be transmitted as if it were an independent message. Specifically, in a preferred embodiment, the data payload length of the message requested to be transmitted is divided into equal submessage payload lengths in step 710. Thereafter, in step 720, an active message entry is enqueued for each submessage specifying use of the same source DGSP and same target DGSP as the other submessages of the message. However, a different offset is specified for each submessage.

FIG. 8 summarizes an algorithm for use in processing an outgoing submessage at a source (transmitting) node of the message. Again, as described above with reference to FIGS. 4 and 6, at step 810 the source DGSP is executed by the dummy DGSM until the start offset of the submessage, in order to arrive at the correct state of the environment and offset to properly handle the outgoing data in the submessage. Thereafter, in step 820, the source DGSP is run on the real DGSM for the data payload length specified by the submessage to process and create the submessage for transferring the outgoing data from the source node.

FIG. 9 is a detailed process diagram illustrating the handling of particular incoming packets to a target (receiving) node of the network. As illustrated in FIG. 9, in a first process step 910, the header of an incoming packet to the target node is read. From there, it is determined in step 920 whether the packet belongs to a first submessage. If the packet does not belong to the first submessage, then in step 930 the target DGSP is run on the dummy DGSM on the target node until the start offset for the submessage given by the submessage ID included in the header of the packet. Then, processing proceeds to step 940. However, when in step 920 the packet does, in fact, belong to the first submessage, processing proceeds directly to step 940. In step 940 it is determined whether the incoming packet is the next expected packet for the submessage corresponding to the incoming packet. If it is not the expected packet, then in step 950, the target DGSP is run on the dummy DGSM of the target node until the offset corresponding to the incoming packet is reached by the dummy DGSM. This process sets up the state of the environment including DGSM state to a point at which the real DGSM can then properly process the data of the incoming packet. Of course, in block 940, when it is determined that the incoming packet is, in fact, the next expected packet for the submessage to which the incoming packet belongs, then step 950 is skipped. Then, the target DGSP need not be executed on the dummy DGSM, because the state information and offset are already been cached and available for use by the real DGSM. After step 950 is performed, in step 960, the real DGSM then executes the target DGSP on the real DGSM to copy or move the payload data from the packet to a target user buffer at the target node, thus completing the processing of the packet. Following the copying/moving of data on the source node as determined by the DGSP, processing then returns to step 910 again, at which time the header of the next incoming packet is read and the same steps are performed again as described above with respect to the next incoming packet.

Note that the examples provided herein are illustrative in that it is not possible to fully describe every possible alternative embodiment within the scope of the invention that the inventors claim by the appended claims below. While the invention has been described in accordance with certain preferred embodiments thereof, many modifications and enhancements can be made thereto without departing from the true scope and spirit of the invention, limited only by the claims appended below.

What is claimed is:

1. A method of communicating message payload data from a first node of a network for delivery to a second node of the network, comprising:
   a) dividing the length of a data payload to be transmitted into a plurality of submessage payload lengths including at least a first submessage payload length and a second submessage payload length;
   b) interpretively executing a first data communication program by a first data communication machine to transmit a first ordered submessage having the first submessage payload length from the first node for delivery to the second node, wherein the execution of the data communication program alters an environment in the first node relating to the data payload transmission from a first state in which data being transmitted are copied starting from a first memory location, to a second state in which data to be transmitted are to be copied starting from a second memory location, wherein the determination of the second memory location requires interpretively executing at least some recursive instructions of the first data communication program;
   c) at least prior to completing step (b), interpretively executing the first data communication program including interpretively executing the at least some recursive instructions by a first dummy data communication machine to determine the second state of the environment in the first node and to determine the second memory location as if the step (b) were already completed, without requiring the first dummy data communication machine to transmit data of the data payload; and
   d) without having to complete step (b) and utilizing the second state of the environment in the first node and the second memory location determined in step (c), interpretively executing the first data communication program by a second data communication machine to transmit a second ordered submessage from the first node for delivery to the second node including copying data to be transmitted starting from the second memory location, the second ordered submessage having the second submessage payload length.

2. The method as claimed in claim 1, wherein the data payload transmitted in the first ordered submessage and the second ordered submessage includes data that are stored in noncontiguous locations in the first node.

3. The method as claimed in claim 2, wherein the steps of transmitting the first ordered submessage and the second ordered submessage include copying data stored at noncontiguous locations in one or more user buffers in the first node to a memory in a communication adapter associated with the first node.

4. The method as claimed in claim 3, further comprising:
   e) interpretively executing a second data communication program by a second data communication machine to receive the first ordered submessage at a second node including executing at least some recursive instructions thereof, wherein the execution of the second data communication program alters an environment in the second node relating to the data payload reception from a first state in which the received data are stored in the second node starting at a third memory location to a second state in which the received data are stored starting at a fourth memory location noncontiguous with the third memory location;

(f) at least prior to completing step (e), interpretively executing the second data communication program including the at least some recursive instructions by a dummy version of the second data communication machine to determine the second state of the environment in the second node and the fourth memory location as if the step (e) were already completed; and (g) without having to complete step (e) and utilizing the second state of the environment in the second node and the fourth memory location determined in step (e), interpretively executing the second data communication program by the second data communication machine to receive the second ordered submessage at the second node and to store the received data thereof starting at the fourth memory location, without having to first receive the first ordered submessage at the second node.

5. The method as claimed in claim 4, wherein the steps of receiving the first ordered submessage and receiving the second ordered submessage includes storing the data payloads of each of the first and second ordered submessages in noncontiguous locations in the second node.

6. The method as claimed in claim 5, wherein the steps of receiving the first ordered submessage and of receiving the second ordered submessage include copying the data payloads therein into noncontiguous locations in one or more user buffers in the second node from a memory in a communication adapter associated with the second node.

7. The method as claimed in claim 1, wherein the first submessage payload length and the second submessage payload length are the same.

8. A method of communicating message payload data from a first node of a network for delivery to a second node of the network, comprising:

dividing the length of a data payload to be transmitted into a plurality of submessage payload lengths including a first submessage payload length and a second submessage payload length;

transmitting a first ordered submessage having the first submessage payload length from the first node for delivery to the second node, including executing a first data communication program by a first data communication machine operable to transmit data, wherein the execution of the first data communication program alters an environment in the first node relating to the data payload transmission from a first state, in which data being transmitted are copied starting from a first memory location, to a second state in which data to be transmitted are to be copied starting from a second memory location, wherein the determination of the second memory location requires interpretively executing at least some recursive instructions of the first data communication program;

determining a second state of an environment in the first node and the second memory location as if the step of transmitting the first ordered submessage were already completed, including interpretively executing the first data communication program including the at least some recursive instructions by a dummy version of the first data communication machine, without requiring the dummy data communication machine to transmit data of the data payload; and without having to complete the step of transmitting the first ordered submessage, transmitting a second ordered submessage from the first node for delivery to the second node including copying data to be transmitted starting from the second memory location, the second ordered submessage having the second submessage payload length and taking into account the second state of the environment in the first node, wherein the data payload transmitted in the first and second ordered submessages includes data stored in noncontiguous locations in the first node and the steps of transmitting the first and second ordered submessages include copying data stored at the noncontiguous locations to a memory in a communication adapter associated with the first node;

taking into account a first state of the environment in the second node, receiving the first ordered submessage at the second node including storing the data received therein starting at a third memory location;

determining a second state of an environment and a fourth memory location, noncontiguous with the third memory location, to which data received in the second node are to be stored, as if the step of receiving the first ordered submessage were already completed; and taking into account the second state of the environment in the second node, receiving the second ordered submessage at the second node including storing the data starting at the fourth memory location, without having to first receive the first ordered submessage at the second node, wherein the steps of receiving the first and second ordered submessages include storing the data payloads of each of the first and second ordered submessages in noncontiguous locations in the second node, and wherein the data communication machine is a first data communication machine and the step of receiving the first ordered submessage includes interpretively executing a second data communication program including at least some recursive instructions thereof and the step of determining the second state of the environment in the second node and the fourth memory location includes executing the second data communication program including the at least some recursive instructions by a dummy version of the second data communication machine, without requiring the dummy version of the second data communication machine not receiving to receive data of the data payload.

9. A computer-readable recording medium having instructions recorded thereon, the instructions being executable by a processor for performing a method of communicating message payload data from a first node of a network for delivery to a second node of the network, the method comprising:

a) dividing the length of a data payload to be transmitted into a plurality of submessage payload lengths including at least a first submessage payload length and a second submessage payload length;

b) interpretively executing a first data communication program by a first data communication machine to transmit a first ordered submessage having the first submessage payload length from the first node for delivery to the second node, wherein the execution of the data communication program alters an environment in the first node relating to the data payload transmission from a first state in which data being transmitted are copied starting from a first memory location, to a second state in which data to be transmitted are to be copied starting from a second memory location, wherein the determination of the second memory location requires interpretively executing at least some recursive instructions of the first data communication program;

c) at least prior to completing step (b), interpretively executing the first data communication program including interpretively executing the at least some recursive instructions by a first dummy data communication machine to determine the second state of the environment in the first node and to determine the second memory location as if the step (b) were already completed, without requiring the first dummy data communication machine to transmit data of the data payload; and d) without having to complete step (b) and utilizing the second state of the environment in the first node and the second memory location determined in step (c), interpretively executing the first data communication program by a second data communication machine to transmit a second ordered submessage from the first node for delivery to the second node including copying data to be transmitted starting from the second memory location, the second ordered submessage having the second submessage payload length.

10. The recording medium as claimed in claim 9, wherein the steps of transmitting the first ordered submessage and the second ordered submessage include copying data stored at noncontiguous locations in one or more user buffers in the first node to a memory in a communication adapter associated with the first node.

11. The recording medium as claimed in claim 10, wherein the method further comprises:

e) interpretively executing a second data communication program by a second data communication machine to receive the first ordered submessage at a second node including executing at least some recursive instructions thereof, wherein the execution of the second data communication program alters an environment in the second node relating to the data payload reception from a first state in which the received data are stored in the second node starting at a third memory location to a second state in which the received data are stored starting at a fourth memory location noncontiguous with the third memory location;

(f) at least prior to completing step (e), interpretively executing the second data communication program including the at least some recursive instructions by a dummy version of the third second data communication machine to determine the second state of the environment in the second node and the fourth memory location as if the step (e) were already completed; and (g) without having to complete step (e) and utilizing the second state of the environment in the second node and the fourth memory location determined in step (e), interpretively executing the second data communication program by the second data communication machine to receive the second ordered submessage at the second node and to store the received data thereof starting at the fourth memory location, without having to first receive the first ordered submessage at the second node.

12. The recording medium as claimed in claim 11, wherein the steps of receiving the first ordered submessage and of receiving the second ordered submessage include copying the data payloads therein into noncontiguous locations in one or more user buffers in the second node from a memory in a communication adapter associated with the second node.

13. An apparatus operable to communicate message payload data from a first node of a network for delivery to a second node of the network, the apparatus including:

a data communication program executable at the first node;

a data communication machine operable to interpretively execute the data communication program at the first node to transmit data from the first node onto the network for delivery to the second node to divide the length of a data payload to be transmitted into a plurality of submessage payload lengths including a first submessage payload length and a second submessage payload length, and to transmit a first ordered submessage having the first submessage payload length from the first node for delivery to the second node, wherein execution of the data communication program to transmit the first ordered submessage alters an environment in the first node relating to the data payload transmission from a first state in which data being transmitted are copied starting from a first memory location to a second state in which data to be transmitted are to be copied starting from a second memory location, wherein the determination of the second memory location requires interpretively executing at least some recursive instructions of the first data communication program; and a dummy version of the data communication machine associated with the first node, the dummy version of the data communication machine being operable as an auxiliary interpreter to interpretively execute the data communication program including the at least some recursive instructions, to determine the second state of an environment in the first node and the second memory location, as if the step of transmitting the first ordered submessage were already completed and without requiring the first ordered submessage to have been transmitted, and the data communication program further being interpretively executable by the first data communication machine to utilize the second state of the environment in the first node determined by execution of the dummy version of the data communication program to transmit a second ordered submessage having the second submessage payload length from the first node for delivery to the second node including copying the data to be transmitted starting from the second memory location, without execution of the data communication program having to complete transmitting the first ordered submessage prior to transmitting the second ordered submessage.

14. The apparatus as claimed in claim 13, wherein the data communication program is interpretively executable by the data communication machine, in connection with transmitting the first ordered submessage and the second ordered submessage, to copy data stored in noncontiguous locations in one or more user buffers in the first node to a memory in a communication adapter associated with the first node.

15. The apparatus as claimed in claim 14, wherein the data communication program is a first data communication program and the apparatus further comprises a second data communication program associated with the second node and being interpretively executable by a second data communication machine, wherein interpretive execution of the second data communication program by the second data communication machine including at least some recursive instructions therein alters an environment in the second node relating to the data payload reception from a first state in which the received data are stored in the second node starting at a third memory location to a second state in which the received data are to be stored starting at a fourth memory location, the apparatus further comprising a dummy version of the second data communication machine operable to execute the second data communication program including the at least some recursive instructions and to determine the second state of the environment in the second node and a fourth memory location to which the received data are to be stored, without requiring the receiving of the first ordered submessage to have been completed, and to utilize the second state determined by interpretive execution of the second data communication program by the dummy version of the second data communication machine to receive the second ordered submessage at the second node and to store the received data starting at the fourth memory location without having to first receive the first ordered submessage at the second node.

16. The apparatus as claimed in claim 15, wherein the second data communication program is interpretively executable by the second data communication machine to receive the first ordered submessage and to receive the second ordered submessage by steps including copying the data payloads in the first and second ordered submessages into noncontiguous locations in one or more user buffers in the second node from a memory in a communication adapter associated with the second node.

* * * * *